United States Patent [19]

Tisue

[11] 3,965,290

[45] June 22, 1976

[54] VIDEO-TO-BINARY CONVERSION APPARATUS HAVING MOIRE SUPPRESSION CHARACTERISTICS

[75] Inventor: James G. Tisue, Mountain View, Calif.

[73] Assignee: Dacom, Inc., Santa Clara, Calif.

[22] Filed: Mar. 21, 1975

[21] Appl. No.: 560,825

[52] U.S. Cl. ............................... 178/6; 178/DIG. 3
[51] Int. Cl.² ........................................... H04N 1/40
[58] Field of Search .................... 178/6, 6.8, DIG. 3; 340/146.3 H

[56] References Cited
UNITED STATES PATENTS

| | | | |
|---|---|---|---|
| 3,649,751 | 3/1972 | So ........................................ | 178/6 |
| 3,715,722 | 2/1973 | Hall ............................. | 340/146.3 H |
| 3,868,477 | 2/1975 | Katzman ....................... | 178/DIG. 3 |
| 3,882,270 | 5/1975 | Ogawa ........................... | 178/DIG. 3 |

Primary Examiner—Howard W. Britton
Attorney, Agent, or Firm—Boone, Schatzel & Hamrick

[57] ABSTRACT

Video-to-binary conversion apparatus for use in image reproduction systems and the like to convert an input video signal to an output binary signal and comprising an output data normalizer for normalizing the binary output data signal relative to the input binary signal, an integrator for integrating the difference between the input video signal and the normalized output data signal and for developing an adaptable, data state determining threshold signal commensurate therewith, and a comparator for comparing the input video signal to the adaptive threshold signal to develop a binary output data signal which corresponds to the input video signal. The circuit electronically compensates for small signal errors which would otherwise occur in the transformation of the scan data from analog-to-binary form and which would give rise to a moiré degradation in the reproduced image.

22 Claims, 9 Drawing Figures

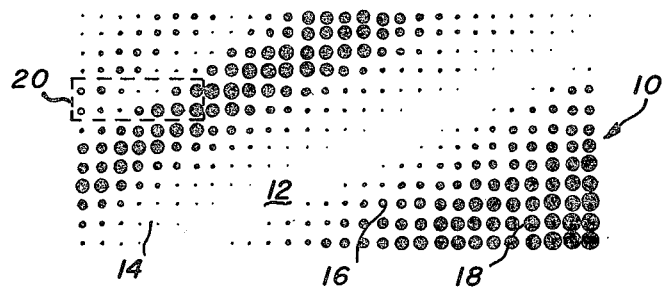
Fig_1
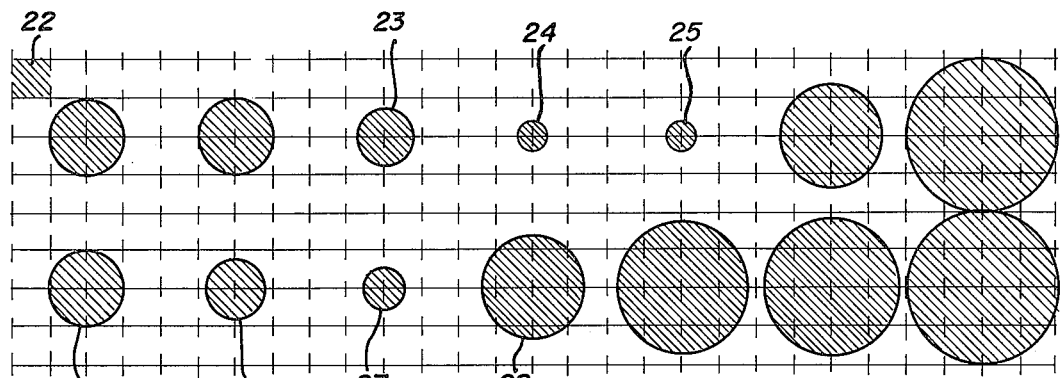
Fig_2
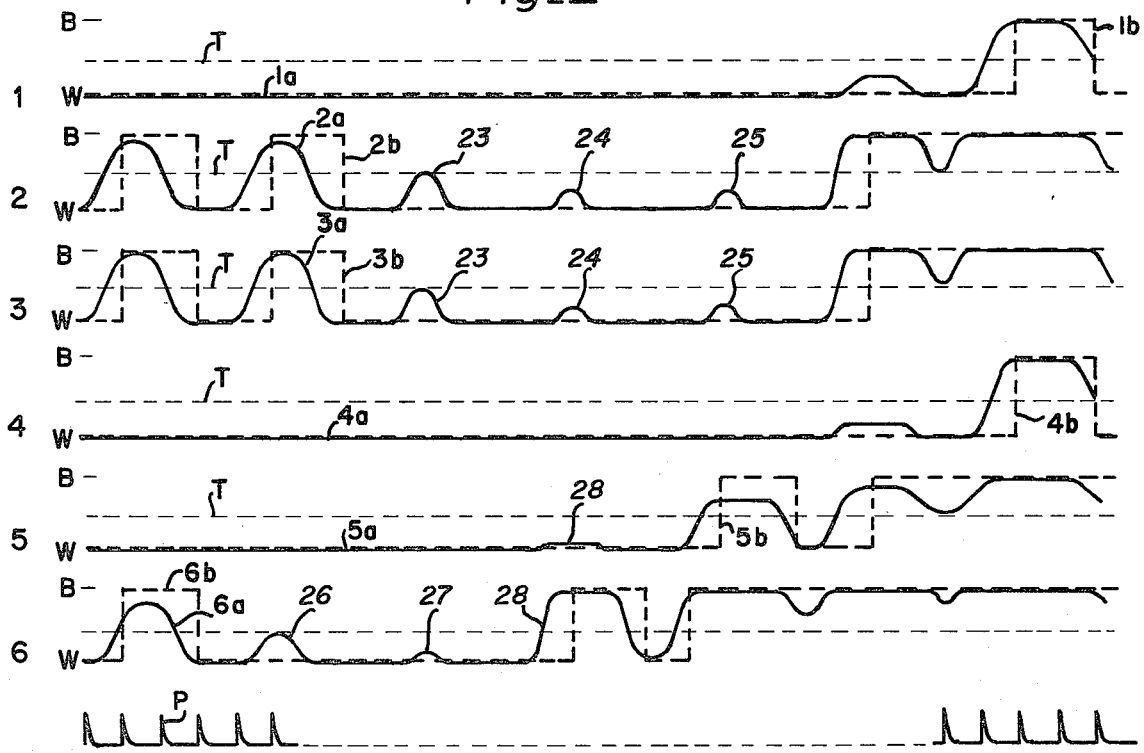
Fig_3

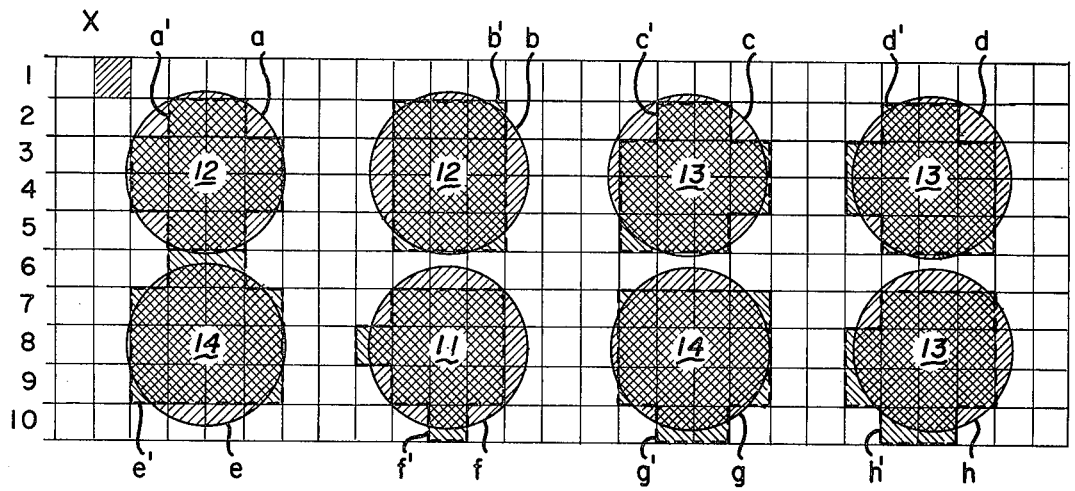
Fig_4
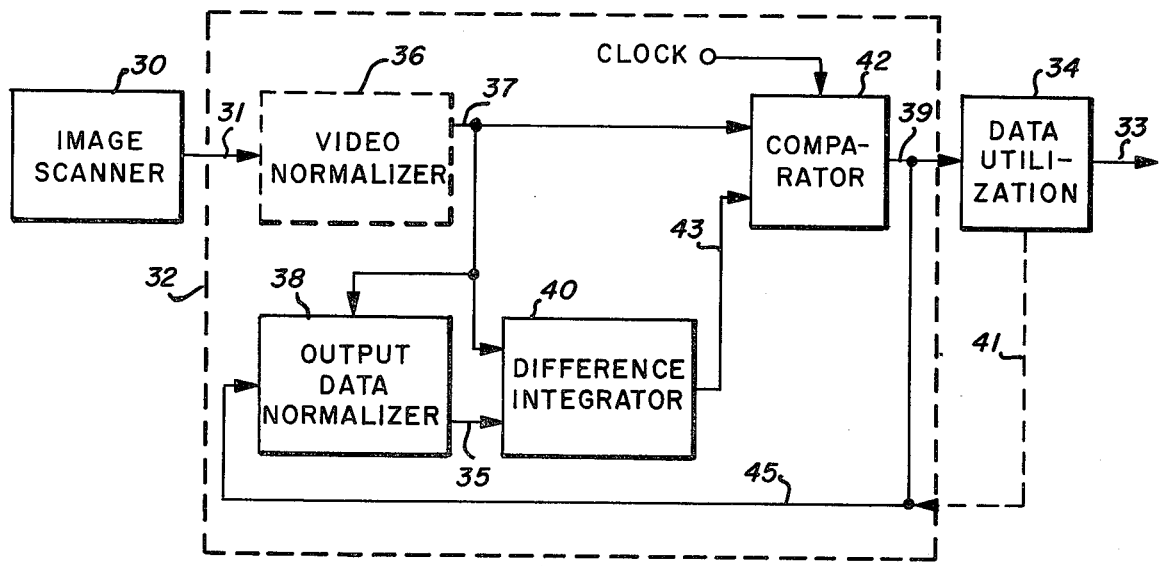
Fig_5

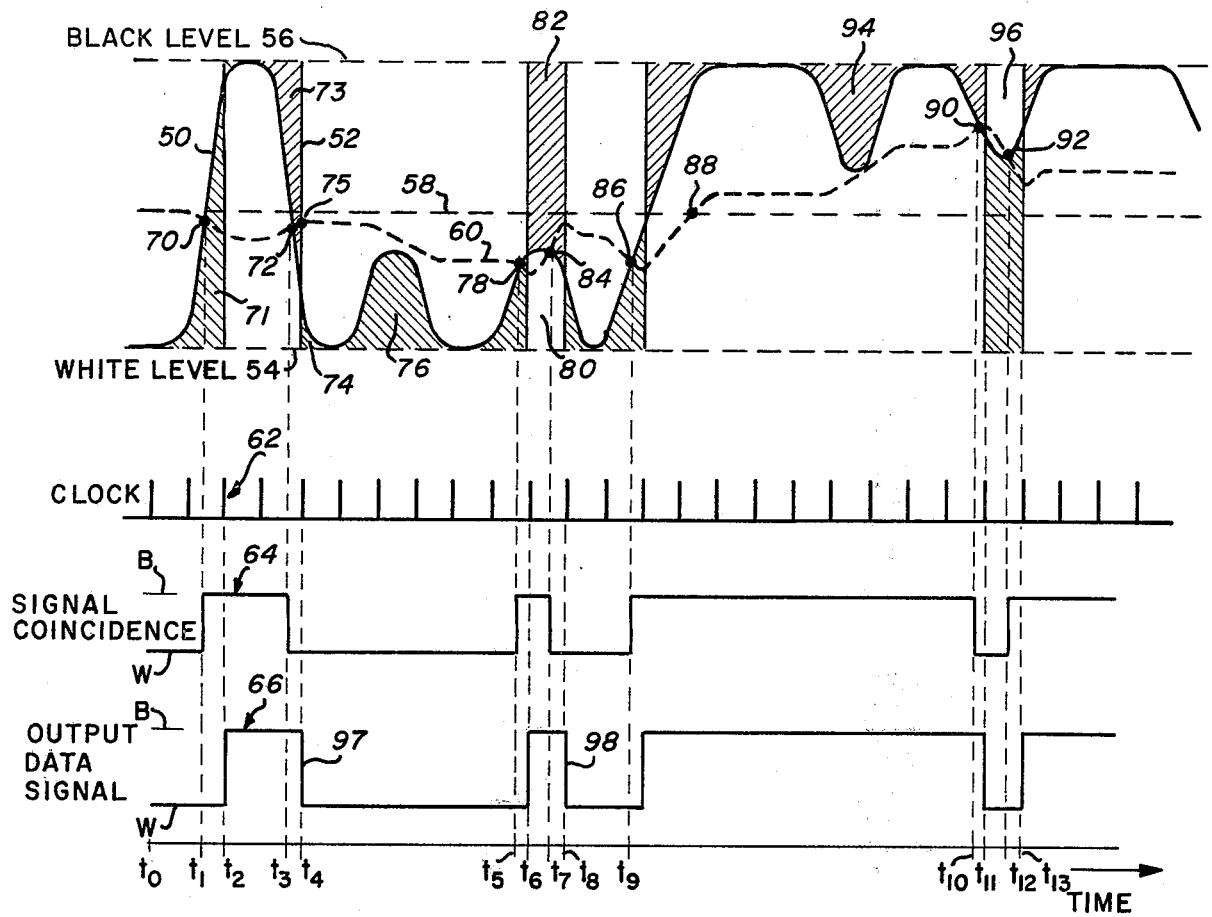
Fig_6
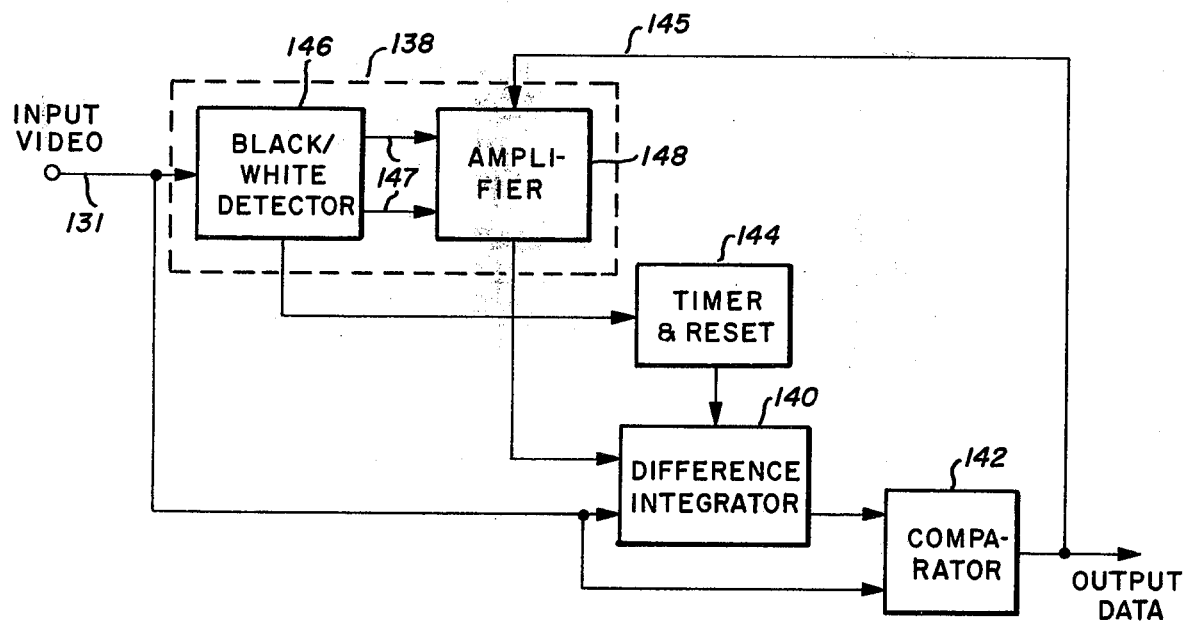
Fig_7

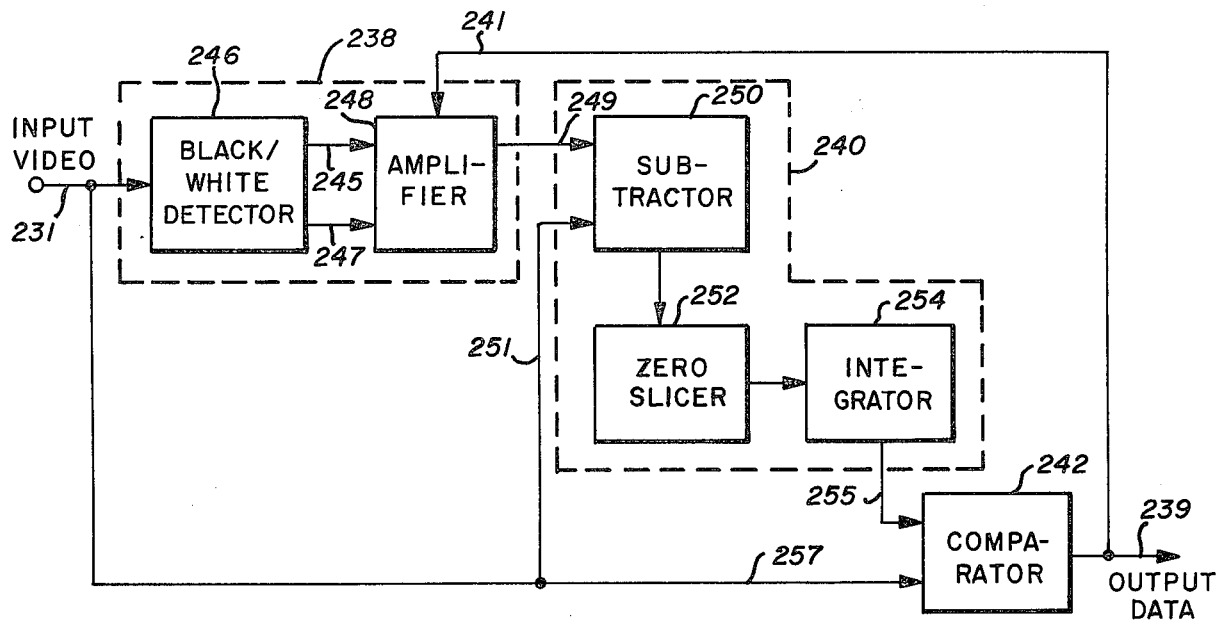
Fig_8
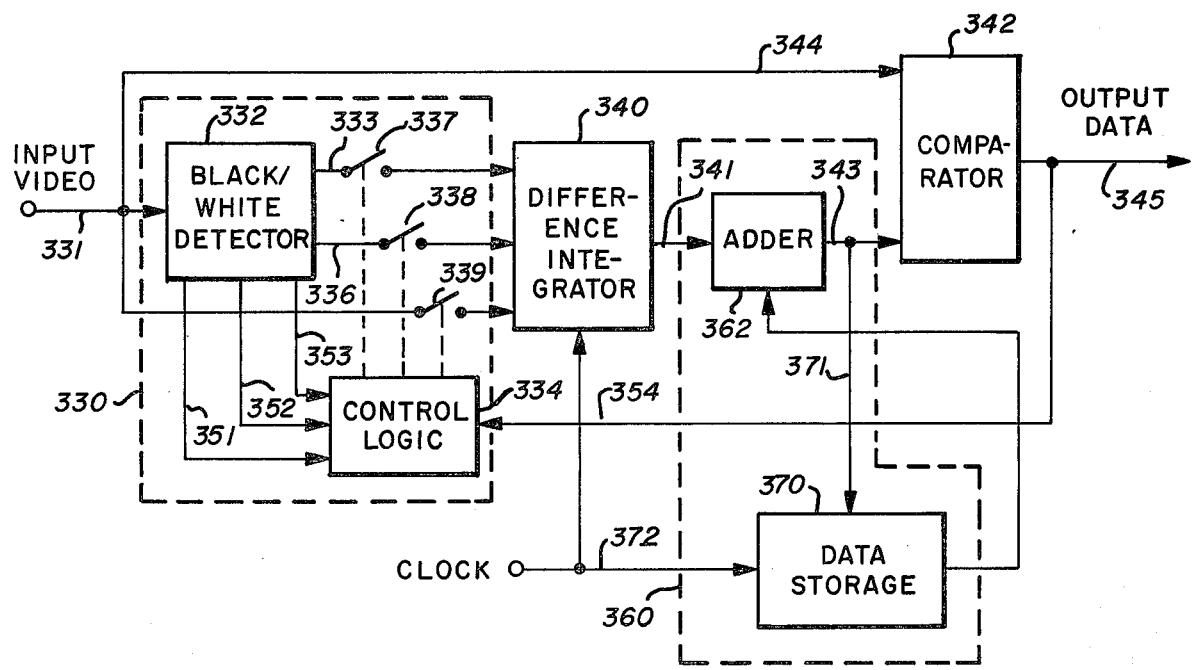
Fig_9

VIDEO-TO-BINARY CONVERSION APPARATUS HAVING MOIRE SUPPRESSION CHARACTERISTICS

BACKGROUND OF THE INVENTION

1. Field of the Invention

The present invention relates generally to image reproduction apparatus, and more particularly to an improved video-to-binary conversion circuit for use in such systems and which has the characteristic of compensating for the usual signal transformation errors that ultimately give rise to moiré in the reproduced image when the original image sought to be reproduced is of the type formed by grouped arrays of dots, lines, holes, lights, etc.

2. Description of the Prior Art

One of the problems affecting the accuracy of reproduction in facsimile transmission/reproduction systems is that associated with the degradation of image which results due to the phenomena known as moiré. The moiré degradation is characterized by the occurrence of unintentional striations appearing in the reproduced image as a result of phase differences between the image-forming elements and the scan-sampling rate. Such striations are likely to occur in a reproduced image any time a periodic sampling is made of an image formed by a regular pattern of dots, lines, light sources or other image-forming elements. The facsimile reproduction of "half-tone" images is especially susceptible to such degradation.

Prior art attempts to solve the moiré problem in facsimile reproduction systems have typically involved the judicious selection of either scan sample rate or scan sample element size which is most likely to cause the least amount of moiré degradation. Such attempts have not however sought to deal directly with the problem and do not usually produce favorable results. Moreover, the prior art solutions have the effect of reducing the utility of certain facsimile transmission systems wherein a particular scan parameter must be preset, since no single setting is universally acceptable for all half-tone grids.

SUMMARY OF THE PRESENT INVENTION

It is therefore an object of the present invention to provide a data conversion circuit for use in an image scanning and reproduction system which electronically adapts itself to the input data so as to avoid making signal conversion errors which usually give rise to moiré degradation in the reproduced image.

Briefly stated, the present invention provides a signal conversion circuit wherein moiré is suppressed by the continuous modification of an input data state determining threshold level so as to account for detected data which would otherwise fall below an arbitrarily set reference level and would thus go undetected. The preferred embodiment is essentially comprised of means for continuously determining the difference between an input video signal and a normalized output data signal to develop an adaptive, data state determining threshold signal, and means for comparing the input video signal to the adaptive threshold signal to develop a binary output data signal which changes state each time the input video signal crosses the adaptive threshold.

One of the principal advantages of the present invention is that it permits an image to be scanned and then be subsequently reproduced in a form which accurately corresponds to that of the original image within the resolution limits of the human eye.

These and other objects and advantages of the present invention will no doubt become apparent to those of ordinary skill in the art after having read the following detailed description of the preferred embodiments illustrated in the several figures of the drawing.

IN THE DRAWING

FIG. 1 is an illustration of a pattern of different sized dots showing the constitution of a half-tone image;

FIG. 2 is an enlarged portion of a section of FIG. 1 for illustrating data scan elements relative to the half-tone array;

FIG. 3 illustrates several typical scanner output signals corresponding to scans across the half-tone portion of FIG. 2;

FIG. 4 is a diagram illustrating the manner in which moire is created;

FIG. 5 is a block diagram generally illustrating an image reproduction system including a generalized preferred embodiment of a moire suppressing data conversion circuit in accordance with the present invention;

FIG. 6 is a timing diagram illustrating operation of the preferred embodiment shown in FIG. 5;

FIG. 7 is an alternative embodiment of the circuit illustrated in FIG. 5;

FIG. 8 is another alternative embodiment of the circuit illustrated in FIG. 5; and FIG. 9 is still another alternative embodiment of the circuit illustrated in FIG. 5.

DETAILED DESCRIPTION OF THE PREFERRED EMBODIMENT

Since the present invention has particular application to the facsimile reproduction of half-tone images, this introductory discussion will be limited thereto. However, it will be appreciated that the embodiments to be later described are not limited in utility to use in systems for reproducing half-tone images but are likewise suitable for use in systems designed to reproduce any other type of image having periodicity of image-forming elements.

FIG. 1 is included herein to illustrate the manner in which an image may be created using the half-tone principle of varying the dot sizes in an array of regularly distributed dots. It is of course to be understood that this dot pattern is shown greatly enlarged compared to a standard half-tone image wherein dot grids having between 50–150 dots per inch are typical. As may be observed from this illustration, generally designated by the numeral 10, diagonal stripes varying in shade from white through shades of gray to shades of black are generated by the grouped arrays of various sized dots. For example, a white stripe 12 is provided by the absence of any dots, a very light gray stripe 14 is produced by a group of very small dots, a darker gray stripe 16 is produced by slightly larger dots and a relatively black stripe 18 is produced by the largest dots.

In order to illustrate how electronically transmittable binary facsimile data is generated, reference is made to FIG. 2, which is an enlargement of the section 20 shown in FIG. 1, and then to FIG. 3 which illustrates the corresponding analog and binary signal waveforms. The solid horizontal lines delineate image strips that will be referred to as scan lines while the vertical dashed lines divide the scan lines into what will be referred to as elemental areas. One such elemental area is from left to right shaded at 22.

As a typical optical scanner is caused to traverse from left to right across the face of an image-containing document and along each scan line, an analog signal will be generated having an amplitude variation determined by the intensity of the light emitted, reflected or transmitted by each elemental area inspected by the scanner. Note that as a black dot is encountered on the white background, the amplitude of the analog curves illustrated in FIG. 3 will rise above a whilte level "w" toward a black level "B" by amounts depending upon the size of the respective dots or dot portions in the scan line. By way of specific example, the scanner output signals 1a–6a shown in FIG. 3 are representative of the first six numbered scan lines illustrated in FIG. 2. If these analog signals are then converted to binary signals by determining the amplitude of the analog signals relative to a data state determining threshold T at the occurrence of clock pulses P which have a period defining the horizontal length of the elemental areas illustrated in FIG. 2, and if each elemental area is identified as being "black" when the analog signal amplitude is greater than the threshold level T and is identified as being" white" when the analog signal amplitude is less than the threshold level T, then the corresponding binary signal for each of curves 1a–6a, respectively, can be characterized by the square waves 1b–6b.

As can readily be seen from these examples, the binary signals do not account for analog signal blips which do not cross the threshold and thus information regarding the dots 23–27 is lost entirely (dropped out), and portions of dot 28 are lost to the extent that the dot cannot be subsequently reproduced in a size identical to its original area. The loss of such data obviously tends to degrade the reproduced image because the quantity of light reflected from a resolution area of the reproduced image will not be the same as the quantity of light reflected from a corresponding resolution area of the original image; resolution area meaning that area over which the human eye is incapable of resolving image differences.

The seriousness of this problem becomes more apparent when it is recognized that in most instances the periodicities of the dot spacing and the clock pulses defining the elemental scan areas are normally not in phase as illustrated. As a result, not only do data dropouts occur to degrade the reproduced image, but the dot locations also vary along the scan line to periodically group in a manner to cause erroneous shadings along the scan line which when combined with similar occurrences in adjacent scan lines gives rise to moiré degradation.

To illustrate this dual phenomena, i.e., the dot dimensional and positional changes, reference is made to FIG. 4 of the drawing wherein eight circular partial image-forming dots "a" through "h" of equal size and spacing are overlaid with a grid intended to be representative of ten horizontal scan lines 1–10 comprised of contiguous elemental areas to be designated as scan elements X. Note, however, that the center-to-center spacing of the dots "a"–"h" is not in phase with the center-to-center spacing of the scan elements X. As a result, if in scanning this "image" only those scan elements which are more than 50% shaded by a dot are classified as black elements, and the remainder are classified as white elements, then not only will the shapes of the several reproduced dots "a'''–"h'" vary, but so will their respective shaded areas and their centroidal spacings. For example, note that the reproduced dots "e'" and "g'" will be comprised of fourteen black elemental areas; dots "c'", "d'" and " h'" will be comprised of thirteen black elemental areas; and dot "f'" will include eleven black elemental areas. Moreover, only dots "a'" and "b'" will have undisplaced centroids, and while dots "e'" and "g'" have their centroids displaced along one axis, the remainder of the dots have their centroids displaced along both axes. Since such changes in dot area and dot positioning will be periodically repeated over the entire image, it will be appreciated that serious moiré degradation may occur.

Turning now to FIG. 5 of the drawing, a simplified block diagram of a facsimile transmission/reproduction system is illustrated which includes an image scanner 30, an improved data conversion circuit 32, and a data utilization means 34. Scanner 30 may take the form of any suitable device or mechanism for scanning an image on a line-by-line basis and to develop an analog signal for each scanned line which varies in magnitude depending upon the light detected along the string of elemental areas forming the scanned line. Alternatively, the scanner output could be in a digital form rather than analog. Such analog or digital signals developed by the scanner are commonly referred to as video signals and will hereinafter be referred to as such. Obviously, the scanning device is not limited to a light reflection sensing mechanism and could just as well be of a type which detects images that are light transmissive, magnetic or otherwise characterized.

The data utilization means 34 may be any type of recording mechanism, printing mechanism, or data transmission mechanism capable of utilizing the binary data developed by the conversion circuit 32. For purposes of this disclosure, it will be understood that the data utilization means 34 includes all necessary data encoders, modems and other equipment required to make a particular system operable and that in the case of a data transmission system, the transmitted data will be output at 33.

Shown within the dashed box 32 is a simplified block diagram of a video-to-binary conversion circuit in accordance with the present invention which includes a video normalizer 36, an output data normalizer 38, a difference integrator 40 and a comparator 42. Video normalizer 36 is shown in dashed lines because it is an optional element of the preferred embodiment which has the capability of modifying the voltage levels of the video signal input on line 31 to produce a normalized video signal on line 37 that varies proportionally between two fixed black and white signal levels. The proportional variation may be either linear or nonlinear. Normalizing amplifier circuits used to apply amplitude and drift correction to input video signals are well known and need not be disclosed in detail herein. For a general discussion of such circuits, reference is made to *Aerospace Telemetry*, Volume II, by Harry L. Stiltz, Prentice-Hall Space Technology Series, 1966, and to U.S. Pat. No. 3,715,722, Richard E. Hall. Alternatively, the video signal developed by scanner 30 could be applied directly to integrator 40 and comparator 42.

Output data normalizer 38 may take any suitable form capable of adjusting the binary output data generated on line 39 by comparator 42 (or that generated by data utilization means 34 on dashed line 41) so that its upper and lower signal levels (binary black and white levels) correspond with the black and white levels of the video signals applied to integrator 40 and comparator 42.

Difference integrator 40 may be any suitable device capable of integrating the difference between the video signal and the normalized output data signal, and of developing an adaptive threshold signal corresponding thereto. One such device is the inverter (19) and summing integrator (21–23) combination disclosed in the above-referenced U.S. Pat. No. 3,715,722. In the preferred embodiment, the output of integrator 40 is initialized to a quiescent "no error" value which is typically midway between the black and white voltage levels of the input video signal so that the adaptive threshold signal will vary above and below the quiescent value depending upon whether the integrated difference is more black or more white. The output of integrator 40 may thus be defined as an adaptive, data state determining threshold signal.

Comparator 42 compares the video signal to the adaptive threshold signal and generates a binary output data signal which switches between logic "0" and logic "1" signal states each time coincidence occurs between the two signals compared. In the preferred embodiment, comparator 42 is clocked so that its output does not switch states immediately upon coincidence of the two signals compared, but instead, switches states at the beginning of the clock period next following the signal coincidence. The output data signal is developed on line 39 for input to the data utilization means 34, and is also returned to the input of output data normalizer 38 on line 45. Alternatively, as indicated by dashed line 41, the output of data utilization means 34 could be returned to normalizer 38 rather than the output of comparator 42. The output of data utilization means might, for example, be returned to normalizer 38 when the utilization means has some special data handling characteristic, such as not accepting an input signal of duration less than a certain number of clocked periods or the like, which in itself may cause black or white errors.

Turning now to FIG. 6 of the drawing, the operation of the conversion circuit 32 will be described with reference to the several waveforms illustrated. In the upper portion of FIG. 6, the curve 50 represents the input video signal, the squarewave 52 respresents the normalized output data signal developed on line 35, the dashed line 54 represents the white level reference potential, the dashed line 56 represents the black level reference potential, the dashed line 58 represents the initial quiescent or "no error" threshold level, and the dashed line 60 represents the adaptive threshold signal developed on line 43 by integrator 40. Waveform 62 represents the clock pulses applied to comparator 42 (or alternatively, to data utilization means 34); waveform 64 represents the logic states between successive coincidences of the signals input to comparator 42, the waveform 66 represents the binary output data signal developed on line 39.

Referring back to the upper portion of FIG. 6, it is assumed that at some starting time $t_o$ the output of integrator 40 is initialized to its quiescent value, and an input video signal, such as is illustrated at 50, is generated by scanner 30 (and perhaps normalized by normalizer 36 where such device is incorporated into the circuit). The output data signal fed back to normalizer 38 on line 45 is also initially assumed to have a white level state and the output data signal is assumed to also be in the white level state as indicated by waveform 66. As video signal 50 begins to rise above the white level 54, integrator 40 will integrate the difference therebetween and accumulate a white dificit tending to drive the adaptive threshold signal (curve 60) toward the white level as indicated. Thereafter, at time $t_1$, the video signal 50 coincides with the adaptive threshold signal at point 70 causing comparator 42 to change states as indicated by waveform 64.

Upon occurrence of the next clock pulse 62, at time $t_2$, comparator 42 causes the output data signal developed on line 39 to change state, as indicated by waveform 66, and likewise, the normalized data signal developed on line 35. Since the video signal 50 reaches the black level at about the same time that the output data signal 52 changes states, the adaptive threshold 60 tends to flatten out until video signal 50 again begins to drop and a positive-going change occurs in threshold 60. Shortly thereafter, at time $t_3$, video signal 50 again intersects threshold 60, at point 72, causing the output of comparator 42 to change state (see waveform 64), and upon the next clock pulse, occurring at time $t_4$, to develop a white level output (waveform 66). At time $t_4$, the threshold deficit is indicated by the position of point 75 relative to the quiescent value (line 58) and is the result of the integrated area 71 being larger than the integrated area 73.

Note that as integrator 40 integrates the difference represented by the shaded areas 74 and 76, threshold 60 continues to move toward the white level, but does not intersect video signal 50 until time $t_5$ (point 78). As a result, the relatively small quantity of data represented by the peak 76 does not cause a corresponding output pulse to be generated but has the effect of causing the threshold 60 to be lowered so that it does intersect the following peak 80, even though peak 80 is no larger than peak 76. Thereafter, at time $t_6$, the output of comparator 42 changes state as indicated by output data signal waveform 66. Since the difference between curve 50 and waveform 52 (as represented by the shaded area 82) is relatively large, the adaptive threshold signal 60 will rise relatively rapidly, intersecting threshold 50 at point 84 and time $t_7$, and thereafter cause comparator 42 to change states at time $t_8$.

Video signal 50 next intersects threshold 60 at point 86 (time $t_9$) and then crosses the quiescent line 58 at point 88 to eventually again intersect threshold 60 at point 90 and then point 92. Note that as was the case with peak 76, video peak 94 did not intersect threshold curve 60. However, peak 96, which was of approximately the same size as peak 94, did intersect curve 60 as the threshold level continued to move toward the black level 56.

Whereas a detection system having an arbitrarily fixed threshold would probably altogether miss the two black-going peaks 76 and 80 as well as the two white-going peaks 94 and 96, the present system adapts itself to develop data which, although not precisely identical to the scanned data, can be used to reconstruct an image that is free of moiré and is accurate to within the resolution limits of the human eye. More specifically, if it is assumed that the length of line scanned during the time interval $t_0$ to $t_{13}$ is less than the width of a resolution area, it will be noted that even though no binary pulse as generated during video blip 76, a pulse 98 was developed during video blip 80 which is effectively equal to one-half of the pulse 97 developed for the first video peak illustrated. Thus, on reproduction, the resolution area will contain a quantity of black data which is commensurate with that of the corresponding area of the scanned image.

Referring now to FIG. 7 of the drawing, an alternative embodiment of a signal conversion circuit in accordance with the present invention is shown to include an output data normalizer 138, a difference integrator 140, a comparator 142 and a timer and reset device 144. In this embodiment, output data normalizer 138 includes a black/white level detector 146 and an amplifier 148. Detector 146 detects the maximum and minimum signal levels of the video signal input at terminal 131 and drives amplifier 148 to cause the output data signal returned via line 145 to be normalized relative to the input video. The output data fed back on line 145 is normalized and amplified by amplifier 148 to floating levels determined by the peak amplitudes of the video signal input at 131.

Timer and reset means 144 monitors the output of detector 146 and feeds a control signal to difference integrator 140 to reset the integrator to its quiescent value if a change in signal state from black to white, or white to black, has not been detected within a predetermined period of time. This is to insure that undetected nonwhite or nonblack areas such as area 76 in FIG. 6 do not affect the comparator output at distances further away along the scan line than the resolution of the human eye can blend or cancel out.

In FIG. 8 of the drawing, another alternate embodiment is illustrated which includes an output data normalizer 238, an integrating network 240, and a comparator 242. Like the previously described embodiment of FIG. 7, this embodiment normalizes the output data relative to the input video data by means of a black/white detector 246 and an amplifier 248. Detector 246 is in essence a dual-acting peak detector which follows the input video and develops a voltage on line 245 that corresponds to the peak levels of black-going video, and develops a voltage on line 247 which corresponds to the peak levels of white-going video.

In response to the output data signal fed back on line 241, amplifier 248 selects one or the other of the signals input thereto on lines 245 and 247, and after appropriate amplification, outputs the selected signal on line 249. This normalized black or white reference level will then be fed into the subtractor 250 of integrating network 240 along with the video which is fed in on line 251. A voltage corresponding to the difference between the two signals is then fed through a "zero slicer" 252 and into integrator 254 which integrates the difference signal and inputs the integrated result into comparator 242 via line 255 where it is compared to the video input on line 257, and output data is developed on line 239 as in the previously described embodiments.

Since it is very difficult to establish precise black and white reference levels, and small uncertainties on the order of approximately 5–10% can well be tolerated by the system, the zero slicer 252, which may, for example, take the form of a dead-band amplifier, in effect simply ignores small differences between the reference level signal and the input video signal, and during the occurrence of such small differences, inputs no signal to integrator 254. It will thus be appreciated that this type of integrating system effectively creates small increments of threshold tolerance near both the black and white reference levels. This is to insure that small and inconsequential differences in the signals input to subtractor 250 do not build up over long stretches of either very near white data or very near black data and cause an erroneous switching of output data signal state.

Turning now to FIG. 9 of the drawing, still another alternative embodiment of the present invention is illustrated which has the capability of effecting data corrections over more than one data scan line and includes a normalizing circuit 330, a difference integrator 340, a comparator 342 and a memory circuit 360. As schematically illustrated, normalizer circuit 330 includes a black/white detector 332, control logic 334 and three switches 337, 338 and 339.

Detector 332 is essentially a peak detector which receives the video signal input at 331 and develops a white level signal on line 333 and a black level signal on line 336 in a manner similar to that of the previously described embodiments. In addition, detector 332 includes threshold determining circuitry for setting a "near black" threshold level and a "near white" threshold level. It also develops black, white and gray logic signals on lines 351, 352 and 353. More specifically, when the input video signal level falls between the black level and the near black threshold, the video will be considered black and a logic "1" will be developed on line 351; when the input video signal level falls between the near black threshold and the near white threshold, the video will be considered gray and a logic "1" will be developed on line 352; and when the input video signal level falls between the near white threshold and the white level, the signal will be considered white and a logic "I" will be developed on line 353.

Control logic 334 contains circuitry which responds to the logic developed on lines 351, 352 and 353, together with the output data signal fed back through line 354, and operates to close various combinations of the switches 337, 338 and 339, as indicated by the following truth table.

TRUTH TABLE

|  | VIDEO WHITE | VIDEO BLACK | VIDEO GRAY |
|---|---|---|---|
|  | LINE 353 = "1" | LINE 351 = "1" | LINE 352 = "1 38 |
| OUTPUT DATA WHITE | ALL SWITCHES OPEN SW. 339 CLOSED | SW. 337 OPEN SW. 338 CLOSED SW. 339 CLOSED | SW. 337 CLOSED SW. 338 OPEN |
| OUTPUT DATA BLACK | SW. 337 OPEN SW. 338 CLOSED SW. 339 CLOSED | ALL SWITCHES OPEN | SW. 337 OPEN SW. 338 CLOSED SW. 339 CLOSED |

As appropriate pairs of switches are closed, voltages corresponding to the input video and one of the reference levels are fed into difference integrator 340 so that it can alternately accumulate the black and white deficits and input such data through adder 362 into comparator 342 for comparison to the input video as in the previously described embodiments. An analysis of the operation of the switches 337–339 as indicated by the truth table will indicate that the integrated result obtained using this embodiment is quite similar to the integrated result obtained using the embodiment shown in FIG. 8 in that both approaches insure that small and inconsequential deficits are not permitted to build up over long stretches of near white or near black data so as to cause an erroneous switching of output data state.

Memory circuit 360 basically includes an adder 362 and a shift register or other data storage means 370 capable of storing adaptive threshold signals corresponding to one or more scan lines. In operation, a first threshold signal developed on line 343 is fed into storage means 370 through line 371 and is retained therein until a clock signal input at 372 causes the stored threshold signal to be read out into adder 362 for addition to a threshold signal corresponding to the next scan line. Alternatively, line 371 could be connected to the integrator output line 341. It will, of course, be appreciated that such storage and addition need not be limited to threshold signals occurring in just two adjacent scan lines but could equally be utilized in multiple line applications. The period of the clock input at 372 is selected to insure that deficit data from preceding scan lines is properly synchronized with the current threshold data being generated by integrator 340, and that any corrective insertion of data is made within an appropriate resolution area. The clock is also used to reset integrator 340 each time a new threshold signal is fed into the data storage means 370. As in the previously described embodiments, comparator 342 compares the summed deficit data, i.e., the adaptive threshold signal, to the input video and develops the output data signal on line 345.

Although several alternative embodiments of the present invention have been described above, it will be appreciated that such examples are clearly not exhaustive and other alterations and modifications will no doubt become evident to one of ordinary skill in the art after having read this disclosure. Accordingly, the disclosure is intended to be exemplary rather than limiting and the appended claims are intended to cover all such alterations and modifications as fall within the true spirit and scope of the invention.

What is claimed is:

1. A video-to-binary conversion circuit having moiré suppression characteristics, comprising:
    means for receiving an input video signal which varies between a first signal level corresponding to one image characteristic and a second signal level corresponding to an opposite image characteristic;
    normalizer means for normalizing a binary output data signal relative to said input video signal and for developing a normalized output data signal;
    integrator means for integrating the difference between said input video signal and said normalized output data signal and for developing an adaptive threshold signal commensurate therewith; and
    comparator means for comparing said input video signal to said adaptive threshold signal to develop said binary output data signal, said binary output data signal changing between first and second data states each time said input video signal is coincident with said adaptive threshold signal.

2. A video-to-binary conversion circuit as recited in claim 1 and further comprising means for normalizing said input video signal in a predetermined manner prior to its input to said integrator means and said comparator means.

3. A video-to-binary conversion circuit as recited in claim 1 wherein said normalizer means includes
    detector means for developing a first video peak level signal, a second video peak level signal, and logic signals indicating within which one of three ranges of signal level said input video signal presently falls; and
    control means responsive to said logic signals and said output data signal and operative to cause particular combinations of said first video peak level signal, said second video peak level signal and said input video signal to be input to said integrator means.

4. A video-to-binary conversion circuit as recited in claim 1 wherein said normalizer means includes peak detecting means for detecting said first signal level and said second signal level of said input video signal and for causing said normalized output data signal to have a first binary signal level commensurate with said first signal level and a second binary signal level commensurate with said second signal level.

5. A video-to-binary conversion circuit as recited in claim 4 and further comprising means for monitoring the operation of said normalizer means and for resetting said integrator means each time said normalized output data signal does not change state within predetermined periods of time.

6. A video-to-binary conversion circuit as recited in claim 1 wherein said integrator means includes means responsive to said normalized output data signal and said input video signal and operative to develop a difference signal commensurate therewith, and means for integrating said difference signal to develope said adaptive threshold signal.

7. A video-to-binary conversion circuit as recited in claim 6 wherein said integrator means further includes means for preventing values of said difference signal less than a predetermined value from being integrated by said means for integrating.

8. A video-to-binary conversion circuit as recited in claim 7 wherein said normalizer means includes peak detecting means responsive to opposite peak signal levels of said input video signal and operative to cause said normalized output data signal to have binary signal levels respectively commensurate therewith.

9. A video-to-binary conversion circuit as recited in claim 1 and further comprising memory circuit means for storing said adaptive threshold signal for a predetermined period of time before it is input to said comparator means.

10. A video-to-binary conversion circuit as recited in claim 9 wherein said memory circuit means includes a data storage means for storing a first adaptive threshold signal, and means for subsequently adding said first adaptive threshold signal to a second adaptive threshold signal and then inputting the sum to said comparator means.

11. A video-to-binary conversion circuit as recited in claim 9 wherein said normalizer means includes peak detecting means responsive to opposite peak signal levels of said input video signal and operative to cause said normalized output data signal to have binary signal levels respectively commensurate therewith.

12. In an image reproduction system including means for scanning an image and developing a video signal commensurate therewith, signal conversion means for converting the video signal to a binary signal, and means for utilizing the binary signal to develop a reproduction of a scanned image, an improved signal conversion means having moiré suppression characteristics comprising:

normalizer means for normalizing said binary signal relative to said video signal;

integrator means for integrating the difference between said video signal and the normalized binary signal to develop an adaptive threshold signal; and comparator means for comparing said video signal to said adaptive threshold signal to develop said binary signal, said binary signal changing binary states each time said video signal has a predetermined relationship to said adaptive threshold signal.

13. In an image reproduction system as recited in claim 12 wherein said normalizer means includes detector means for developing a first video peak level signal, a second video peak level signal, and logic signals indicating within which one of three ranges of signal level said video signal presently falls, and control means responsive to said logic signals and said binary signal and operative to cause particular combinations of said first video peak level signal, said second video peak level signal and said input video signal to be input to said integrator means.

14. In an image reproduction system as recited in claim 12 wherein said improved signal conversion means further comprises means for normalizing said video signal in a predetermined manner prior to its input to said integrator means and said comparator means.

15. In an image reproduction system as recited in claim 12 wherein said normalizer means includes peak detecting means for detecting a black video peak level and a white video peak level of said video signal and for causing the normalized binary signal to have a first binary signal level commensurate with said black video peak level and a second binary signal level commensurate with said white video peak level.

16. In an image reproduction system as recited in claim 15 wherein said improved signal conversion means further comprises means for monitoring the operation of said normalizer means and for resetting said integrator means each time said normalized binary signal does not change state within predetermined periods of time.

17. In an image reproduction system as recited in claim 12 wherein said integrator means includes means responsive to said normalized binary signal and said video signal and operative to develop a difference signal commensurate therewith, and means for integrating said difference signal to develop said adaptive threshold signal.

18. In an image reproduction system as recited in claim 17 wherein said integrator means further includes means for preventing values of said difference signal less than a predetermined value from being integrated by said means for integrating.

19. In an image reproduction system as recited in claim 18 wherein said normalizer means includes peak detecting means responsive to opposite peak signal levels of said video signal and operative to cause said normalized binary signal to have binary signal levels respectively commensurate therewith.

20. In an image reproduction system as recited in claim 12 wherein said improved signal conversion means further comprises memory circuit means for storing said adaptive threshold signal for a predetermined period of time before it is input to said comparator means.

21. In an image reproduction system as recited in claim 20 wherein said memory circuit means includes a data storage means for storing a first adaptive threshold signal, and means for subsequently adding said first adaptive threshold signal to a second adaptive threshold signal and then inputting the sum to said comparator means for comparison to said video signal.

22. In an image reproduction system as recited in claim 20 wherein said normalizer means includes peak detecting means for detecting opposite peak signal levels of said video signal and for causing said normalized binary signal to have binary signal levels respectively commensurate therewith.

* * * * *

UNITED STATES PATENT OFFICE
CERTIFICATE OF CORRECTION

Patent No. 3,965,290  Dated June 22, 1976

Inventor(s) James G. Tisue

It is certified that error appears in the above-identified patent and that said Letters Patent are hereby corrected as shown below:

Column 2, line 19, "moire" should be --moire'--;

Column 2, line 22, "moire" should be --moire'--;

Column 3, line 12, "whilte" should be --white--;

Column 5, line 58, delete "the" (second occurrence) and insert therefore --and--;

Column 6, line 66, "as" should be --was--;

Column 8, line 45, "I" should be --"1"--;

Column 8, lines 52-60, entitled "TRUTH TABLE" should read as follows:

|  | VIDEO WHITE LINE 353 = "1" | VIDEO BLACK LINE 351 = "1" | VIDEO GRAY LINE 352 = "1" |
|---|---|---|---|
| OUTPUT DATA WHITE | ALL SWITCHES OPEN | SW. 337 OPEN SW. 338 CLOSED SW. 339 CLOSED | SW. 337 CLOSED SW. 338 OPEN SW. 339 CLOSED |
| OUTPUT DATA BLACK | SW. 337 OPEN SW. 338 CLOSED SW. 339 CLOSED | ALL SWITCHES OPEN | SW. 337 OPEN SW. 338 CLOSED SW. 339 CLOSED |

Signed and Sealed this

Seventh Day of September 1976

[SEAL]

Attest:

RUTH C. MASON
Attesting Officer

C. MARSHALL DANN
Commissioner of Patents and Trademarks